(12) United States Patent
Schoenek et al.

(10) Patent No.: US 8,123,656 B2
(45) Date of Patent: Feb. 28, 2012

(54) HYBRID TRANSMISSION WITH DISCONNECT CLUTCH AND METHOD OF STARTING AN ENGINE USING SAME

(75) Inventors: Norman Schoenek, Novi, MI (US); Shawn H. Swales, Canton, MI (US); Joel M. Maguire, Northville, MI (US); Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 699 days.

(21) Appl. No.: 12/245,815

(22) Filed: Oct. 6, 2008

(65) Prior Publication Data

US 2010/0087290 A1    Apr. 8, 2010

(51) Int. Cl.
*B60W 10/02* (2006.01)
(52) U.S. Cl. .......................................... 477/5; 180/65.21
(58) Field of Classification Search .................. 477/3, 5, 477/151, 80; 180/65.21, 65.22, 65.225, 65.27
See application file for complete search history.

(56) References Cited

U.S. PATENT DOCUMENTS

| | | | |
|---|---|---|---|
| 5,789,823 A | 8/1998 | Sherman | |
| 5,931,757 A | 8/1999 | Schmidt | |
| 6,148,784 A * | 11/2000 | Masberg et al. | 123/192.1 |
| 6,599,214 B2 | 7/2003 | Swales | |
| 6,953,409 B2 | 10/2005 | Schmidt et al. | |
| 7,347,803 B2 * | 3/2008 | Kobayashi et al. | 477/5 |
| 7,351,182 B2 * | 4/2008 | Kobayashi | 477/5 |
| 7,608,011 B2 * | 10/2009 | Grabowski et al. | 477/5 |
| 7,712,560 B2 * | 5/2010 | Kozarekar | 180/65.21 |
| 7,753,147 B2 * | 7/2010 | Usoro | 180/65.27 |
| 2007/0259755 A1 * | 11/2007 | Tanishima | 477/3 |
| 2007/0278022 A1 * | 12/2007 | Tanishima | 180/65.2 |
| 2008/0051242 A1 * | 2/2008 | Usoro | 475/5 |
| 2008/0125264 A1 * | 5/2008 | Conlon et al. | 475/5 |
| 2008/0182698 A1 * | 7/2008 | Matsubara et al. | 475/151 |
| 2009/0036246 A1 * | 2/2009 | Bucknor et al. | 475/5 |
| 2009/0042691 A1 * | 2/2009 | Matsubara et al. | 477/80 |
| 2009/0101465 A1 * | 4/2009 | Hart et al. | 475/5 |

* cited by examiner

*Primary Examiner* — Hau Phan
(74) *Attorney, Agent, or Firm* — Quinn Law Group, PLLC (57) ABSTRACT

A hybrid transmission is provided with a motor and a torque-transfer device is operable to transfer torque from the motor to a transmission input member upstream in power flow from the transmission gearing arrangement. The torque transfer device may be a fluid coupling, such as a torque converter, including a torque converter lock-up clutch. In other embodiments, the torque transfer device is a launch clutch that may be either a wet clutch engagable via pressurized transmission fluid, or a dry clutch, such as used in a manual transmission. A disconnect clutch is selectively engagable to operatively connect an engine connection member with the motor to permit the motor to start the engine, such as after a stop. Many embodiments of the transmission include a one-way clutch arranged in parallel with the disconnect clutch. A method of starting the engine using such a transmission is also provided.

18 Claims, 5 Drawing Sheets

Fig-10

# HYBRID TRANSMISSION WITH DISCONNECT CLUTCH AND METHOD OF STARTING AN ENGINE USING SAME

TECHNICAL FIELD

The invention relates to a hybrid transmission having a motor operable for powering the transmission and being connectable to an engine.

BACKGROUND OF THE INVENTION

One type of hybrid transmission is a transmission that may be powered by an engine as well as an electric motor/generator connected with an energy storage device. A key goal in designing a hybrid powertrain is to enable high operating efficiency over various operating modes to meet a wide variety of vehicle operating conditions. Often, an electric-only operating mode (i.e., wherein the vehicle is powered only by the motor) and an engine-only operating mode are provided. A hybrid operating mode, in which both the engine and the motor add power, may also be provided. Efficiencies in conducting the various operating modes to best meet vehicle power demands while maintaining smooth transitions between modes are desired.

SUMMARY OF THE INVENTION

A hybrid transmission is provided that includes an engine connection member configured for continuous connection with an engine. The transmission further includes a motor, which may be an electric motor/generator, and a torque-transfer device that is operable to transfer torque from the motor to a transmission input member connected with a transmission gearing arrangement, with the transmission input member being upstream in power flow from the transmission gearing arrangement. A component is "upstream" in power flow from another component when it receives applied torque prior to the other component. The torque transfer device provides a controllable connection between the transmission input member and the powering devices (i.e., the motor and the engine) to enable smooth transitioning between operating modes. A damping mechanism may be used to connect the engine with the torque transfer device in order to isolate engine vibrations. The transmission gearing arrangement may be a mechanical gearing arrangement without any additional motors, such that the hybrid transmission is a "single motor" hybrid, i.e., the motor described above is the only motor used to power the transmission. The motor may be a motor/generator, operable as a generator as well to selectively convert rotational torque into stored electrical energy.

The torque transfer device is a coupling arrangement that may be of different forms in different embodiments. In many embodiments, the torque transfer device is a fluid coupling such as a torque converter, including a torque converter lock-up clutch. In other embodiments, the torque transfer device is a launch clutch that may be either a wet clutch engagable via pressurized transmission fluid, or a dry clutch, such as used in a manual transmission. A launch clutch may be more compact than a torque converter, minimizing axial length of the transmission. As used herein, a "dry clutch" is a clutch that does not utilize transmission fluid at the clutching interface, whereas a "wet clutch" utilizes transmission fluid for engagement and for lubrication and cooling of the clutched interface.

A disconnect clutch is selectively engagable to operatively connect the engine connection member with the motor to permit the motor to start the engine, such as after a stop at a traffic light. The disconnect clutch allows the engine to be disconnected when not used to power the transmission, thus minimizing parasitic losses that could result from the drag of engine weight. In any embodiment shown herein, the disconnect clutch may connect to the engine connection member through the damping mechanism, or may connect directly to the engine connection member, bypassing the damping mechanism.

Many embodiments of the transmission include a one-way clutch arranged in parallel with the disconnect clutch. That is, the one-way clutch has a first rotatable element continuously connected for rotation with the engine connection member and a second rotatable element continuously connected for rotation with the motor. The one-way clutch is configured to overrun when the second rotatable element rotates faster than the first rotatable element. Thus, the one-way clutch carries torque when the engine powers the transmission, allowing the disconnect clutch to be disconnected after the motor is used to start the engine. The one-way clutch overruns when the motor powers the transmission and the engine is either off or is powering the engine connection member at a slower speed than the motor.

A transmission pump may be connected for rotation with the motor, so that the pump may be powered by the motor regardless of whether the engine connection member is rotating. Thus, an auxiliary oil pump is not required for transmission oil pressure during engine start/stop periods, reducing components and mass.

Specific fluid transport arrangements are provided to enable pressurized fluid flow from the torque transfer device and for cooling the motor/generator. For example, a tubular member may be provided coaxial and in sealing engagement with the inside of the transmission input member to define a channel with the transmission input member for transporting pressurized fluid to the torque transfer device. Furthermore, inner and outer hub members coaxial with the input member may be provided with a rotor of the motor supported for rotation with the inner hub member and concentrically surrounding the stator and the engine operatively connected with the outer hub member. The disconnect clutch selectively connects the inner and outer hub members.

A method of starting an engine connected with a hybrid transmission described above is also provided. The method includes providing stored electrical power from a battery to the motor, thereby running a transmission pump connected with the motor to pressurize transmission oil (also referred to herein as transmission fluid). Selected ratio clutches are then engaged in a transmission gearing arrangement via the pressurized fluid, and the transmission is powered through a torque transfer device by the motor. The charge level of the battery is monitored and a disconnect clutch between the motor and the engine is engaged when the monitored battery charge level falls to a predetermined level, thereby allowing the motor to start the engine. In many transmission embodiments, the engine automatically transfers torque through a one-way clutch arranged in parallel with the disconnect clutch and through the torque transfer device to the transmission gearing arrangement when engine speed is at least at motor speed. The one-way clutch overruns when the motor speed is greater than engine speed. The disconnect clutch is then disengaged when the engine transfers torque through the one-way clutch.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
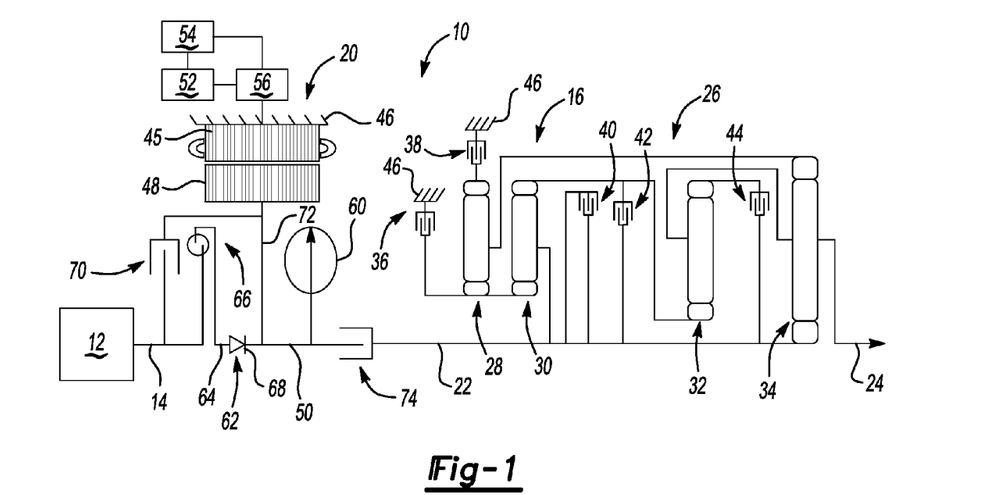
FIG. 1 is a schematic illustration of a first embodiment of a hybrid powertrain including a first embodiment of a hybrid transmission.

Referring to the drawings, wherein like reference numbers refer to like components throughout the views, FIG. 1 shows a hybrid powertrain 10 that includes an engine 12 connected to an engine connection member 14 of a hybrid transmission 16 so that the engine connection member 14 rotates commonly with an engine output member, such as an engine crankshaft. The hybrid transmission 16 includes an electric motor/generator 20 operatively connectable with the engine 12 and with a transmission input member 22, as explained herein. The engine 12 is also operatively connectable to the transmission input member 22 as further explained below.

Various operating modes are available to provide torque from the transmission input member 22 to a transmission output member 24 through a transmission gearing arrangement 26. The transmission gearing arrangement 26 includes a variety of transmission gears, here in the form of interconnected planetary gear sets 28, 30, 32, 34, and selectively engagable ratio clutches 36, 38, 40, 42, 44 (including both stationary-type and rotating-type clutches) that are engaged in different combinations via pressurized transmission fluid to provide a variety of speed ratios between the transmission input member 22 and the transmission output member 24. Although a specific transmission gearing arrangement 26 is shown for purposes of illustration in FIG. 1, a wide variety of transmission gearing arrangements may be connected between the transmission input member 22 and the transmission output member 24 within the scope of the claimed invention. For example, the transmission gearing arrangement may instead be a countershaft arrangement having intermeshing gears, or a combination of planetary gear sets with intermeshing gears, with either fewer or more selectively engagable clutches.

The entire hybrid transmission 16 between the engine connection member 14 and the transmission output member 24 is contained in one or more interconnected housings or casings (shown only in fragmentary manner, such as stationary member 46). For clarity in the drawings, components of the hybrid transmission 16 are shown only above the engine connection member 14, the transmission input member 22 and the transmission output member 24 in FIG. 1, but many of the components are substantially symmetrical about these members, as will be well understood by those skilled in the art.

The motor generator 20 includes a stator 45 grounded to a stationary member 46, such as a transmission housing. A rotor 48 of the motor/generator 20 is rotatable concentrically about and with an intermediate shaft 50 via a rotor hub 72. The stator 45 may receive electrical power from or provide electrical power to an energy storage device such as a battery 52. An electronic controller 54 is in signal communication with the battery 52 and with a power inverter 56 that is also in electrical communication with the stator 45. The controller 54 responds to a variety of input signals including vehicle speed, operator demand, the level at which the battery 52 is charged and the power being provided by the engine 12 to regulate the flow of power between the motor/generator 20 and the battery 52 via the inverter 56, which converts between direct current provided or utilized by the battery 52 and alternating current provided or utilized by the stator 45. The level at which the battery 52 is charged is monitored by any number of known indicators, such as by a voltmeter to monitor the battery voltage and/or monitoring the battery discharge current.

The main transmission pump 60 used for pressurizing transmission fluid for actuating the ratio clutches 36, 38, 40, 42 and 44 and for cooling and lubrication throughout the transmission 16 is connected for common rotation with the rotor 48 via the intermediate shaft 50. Thus, the motor/generator 20 drives the transmission pump 60 regardless of whether the engine 12 is started or stopped.

A one-way clutch 62 is connected between the engine connection member 14 and the intermediate shaft 50. The one-way clutch 62 includes a first rotatable element 64 that rotates with an output side of a damping mechanism 66. The damping mechanism 66 may be but is not limited to a torsional spring. An input side of the damping mechanism 66 is connected with the engine connection member 14. The damping mechanism 66 isolates torsional vibrations of the engine 12 from the intermediate shaft 50 and the remainder of the hybrid transmission 16.

The one-way clutch 62 includes a second rotatable element 68 connected for rotation with the intermediate shaft 50. The one-way clutch 62 is configured to overrun if the second rotatable element 68 and intermediate shaft 50 rotate faster than the first rotatable element 64 (i.e., the one-way clutch 62 overruns (i.e., free wheels without transferring torque) when the rotor 48 rotates faster than the engine connection member 14). The one-way clutch 62 engages (i.e., locks the first rotatable element 64 for common rotation with the second rotatable element 68) to transfer torque from the first rotatable element 64 to the second rotatable element 68 when the first rotatable element 64 rotates faster than or at the same speed as the second rotatable element 68 (i.e., when the engine 12 and engine connection member 14 rotate faster than the rotor 48). A variety of one-way clutches are readily available to perform as indicated.

The one-way clutch 62 is connected in parallel with a selectively engagable disconnect clutch 70. The disconnect clutch 70 is engagable to connect the engine connection member 14 for common rotation with the rotor 48 and intermediate shaft 50 (via rotor hub 72). Thus, like the one-way clutch 62, the disconnect clutch 70 is engagable to transfer torque from the engine connection member 14 to the intermediate shaft 50; accordingly, the one-way clutch 62 and the disconnect clutch 70 are referred to as "in parallel" with one another as they are each engagable to connect the same two components. As discussed further below, within the scope of the claimed invention, the disconnect clutch 70 may be a dry or a wet clutch. A torque transfer device 74, which in this embodiment is a selectively engagable clutch that may be a wet clutch or a dry clutch and is referred to as a vehicle launch clutch, is engagable to transfer torque from the intermediate shaft 50 to the transmission input member 22. The transmission input member 22 and the transmission gearing arrangement 26 do not receive torque from either the motor/generator 20 or the engine 12 without engagement of the torque transfer device 74. The torque transfer device 74 may be a wet friction clutch engagable at a controlled slip to enable smooth transitions in power flow. Alternately, the torque transfer device torque transfer device 74 may be a dry clutch, similar to a manual transmission shifting clutch.

The hybrid transmission 16 with the one-way clutch 62 and disconnect clutch 70 connected in parallel with one another and upstream in power flow from the motor/generator 20 and the transmission gearing arrangement 26 but downstream in power flow from the engine connection member 14 (i.e., in power flow between the engine 12 and the motor/generator 20 and also between the engine and the transmission gearing arrangement 26), the hybrid transmission 16 may be controlled according to a method allowing the motor 20 to restart the engine 12 after a stop such as at a stoplight. Specifically, when the vehicle inputs (such as from an accelerator pedal) to the controller 54 indicate a need to start the engine 12, stored electrical power from the battery 52 is directed through the inverter 56 to the motor/generator 20 to power the motor/generator as a motor. The transmission pump 60 connected for rotation with the rotor 48 is thus driven to pressurize transmission fluid. The disconnect clutch 70 is not engaged during this time. Accordingly, when motor/generator 20 is powering the transmission 16, none of the torque from the motor/generator 20 is used to rotate upstream powertrain components such as the engine 12, minimizing parasitic losses. As used herein components such as shafts are "upstream" in power flow in relation to other components in the transmission 16 when they receive torque applied to the engine connection member 14 by the engine 12 prior to the other components. Similarly, components are "downstream" in power flow relation to other components in the transmission 16 when they receive torque applied to the engine connection member 14 by the engine 12 after the other components.

The controller 54 relays an electrical signal to an electrohydraulic valve body (not shown) to direct the pressurized fluid to selected ones of the ratio clutches 36, 38, 40, 42, 44 to engage the clutches. The torque transfer device 74 is then engaged to establish torque transfer from the motor/generator 20 to the transmission input member 22 and through the transmission gearing arrangement 26 to the transmission output member 24. The charge level of the battery 52 is monitored while the motor/generator 20 provides power. The disconnect clutch 70 between the motor/generator 20 and the engine 12 is engaged when the monitored battery charge level falls to a predetermined level, thereby sending torque from the motor/generator 20 to the engine connection member 14 and starting the engine. Connection of the engine 12 with the motor/generator 20 increases the torque load on the motor/generator 20, slowing the motor/generator 20. As the speed of the engine 12 increases, the one-way clutch 62 engages and automatically transfers torque through the engaged torque transfer device 74, the transmission input member 22 and the transmission gearing arrangement 26 to the transmission output member 24. The disconnect clutch 70 is then disengaged and the one-way clutch 62 carries all of the torque from the engine 12.

The motor/generator 20 may be operated as a generator to slow the intermediate shaft 50 as desired, such as during braking. The disconnect clutch 70 may also be used to provide braking when the battery 52 is fully charged. The method may also be applied to the additional embodiments described below, slightly modified for those embodiments having a fluid coupling in the form of a torque converter, with a torque converter clutch, as described with respect to the embodiment of FIG. 2, because the fluid coupling of a torque converter continuously transfers torque and need not be engaged via a controller, although a torque converter clutch is engagable via the controller to bypass the fluid coupling.

Second Embodiment

Figure 2:
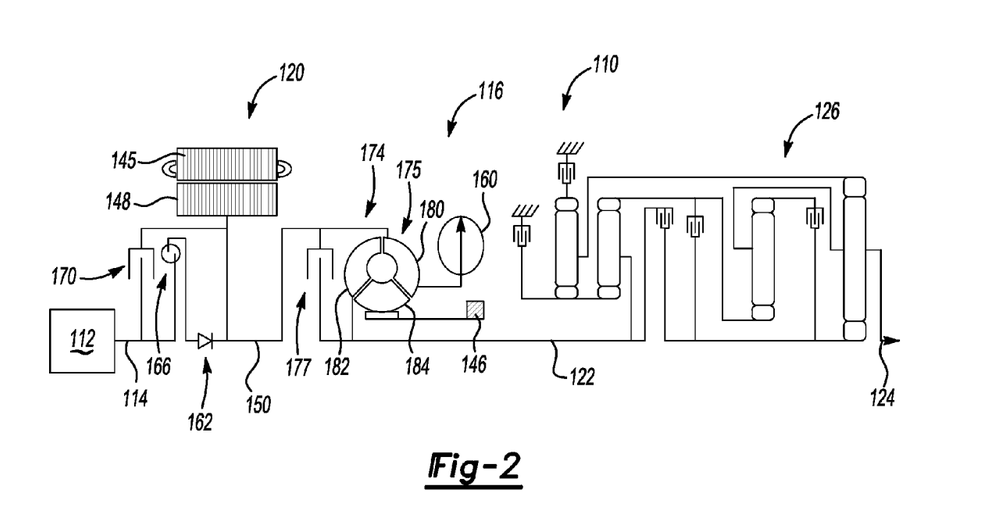
FIG. 2 is a schematic illustration of a second embodiment of a hybrid powertrain including a second embodiment of a hybrid transmission.

Referring to FIG. 2, a second embodiment of a hybrid powertrain 110 includes an engine 112 connected to an engine connection member 114 of a hybrid transmission 116 so that the engine connection member 114 rotates commonly with an engine output member, such as an engine crankshaft. The hybrid transmission 116 includes an electric motor/generator 120 operatively connectable with the engine 112 and with a transmission input member 122, as explained herein. An energy storage device such as a battery (not shown) receives electrical power from or provides electrical power to the stator 145 of the motor/generator via a controller and a power inverter (not shown), as explained with respect to the like components of FIG. 1 and well understood by those skilled in the art. The engine 112 is also operatively connectable to the transmission input member 122 as further explained below. Various operating modes are available to provide torque from the transmission input member 122 to a transmission output member 124 through a transmission gearing arrangement 126 shown for purposes of illustration identical to transmission gearing arrangement 26 of FIG. 1, but representing any variety of mechanical transmission gear and clutch arrangements.

The transmission 116 includes a disconnect clutch 170, damper 166 and one-way clutch 162 arranged and operable in like manner as described with respect to the like components (disconnect clutch 70, damper 66 and one-way clutch 62) of FIG. 1. The transmission 116 differs from transmission 16 of FIG. 1 in that the torque transfer device 174 is a torque converter including a fluid coupling 175 and a selectively engagable torque converter lock-up clutch 177, rather than the selectively engagable wet or dry friction clutch 74 of FIG. 1. The fluid coupling 175 of the torque converter 174 includes a pump portion 180 connected for rotation of a main transmission pump 160 and with an intermediate shaft 150 that is also connected with the rotor 148. Thus, the pump 160 can be driven by the motor 120 when the engine 112 is stopped. A turbine portion 182 of the fluid coupling 175 is connected for rotation with the transmission input member 122 and is driven by the pump portion 180. A stator portion 184 is grounded to a stationary member 146, such as a torque converter housing or the transmission casing.

The hybrid powertrain 110 is operable to power the transmission 116 from a stop and start the engine 112 according to the method described with respect to FIG. 1, with the disconnect clutch 170 and the one-way clutch 162 operating in like manner as disconnect clutch 70 and one-way clutch 62 of FIG. 1, with the disconnect clutch 170 being engaged after motor charge has dropped to a predetermined level and then disengaged after the engine 112 is started and the one-way clutch 162 is carrying torque. However, because the torque converter 174 is used in lieu of a launch clutch (i.e. torque transfer device 74), when the motor 120 is being used to launch the transmission 116 from a stop before the engine 112 is started, the fluid coupling 175 does not transfer significant torque to the transmission input member 122 at speeds below the equivalent of typical fueled engine idle speed (e.g., 600 revolutions per minute). The transmission pump 160 provides adequate pressure for engaging the selected ratio clutches of the transmission gearing arrangement 126 at such speeds, however. The torque converter clutch 177 is not engaged at such speeds to allow the benefits of torque multiplication and hydraulic isolation of vibrations (i.e., damping) through the fluid portion 175. Once significant torque transfer is accomplished through the fluid coupling 175, the torque converter clutch 177 is engaged to lock-up and bypass the fluid coupling 175, providing direct torque transfer from the motor/generator 120 to the transmission input member 122 and eliminating the loss associated with torque transfer through the fluid coupling.

Third Embodiment

Figure 3:
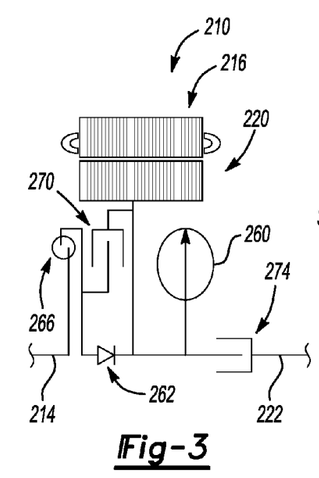
FIG. 3 is a schematic illustration of a portion of a third embodiment of a hybrid powertrain including a third embodiment of a hybrid transmission.

Referring to FIG. 3, a third embodiment of a hybrid powertrain 210 shows a portion of a hybrid transmission 216 with an engine connection member 214 and a transmission input member 222. An engine (not shown) is connected to the engine connection member 214 and operatively connectable to a transmission gearing arrangement (not shown, but connected with the transmission input member 222), in the same fashion as with respect to the powertrain of FIG. 1. A transmission pump 260 is driven by the motor/generator 220 when the engine is not powering the transmission 216. A torque transfer device in the form of a launch clutch 274 is selectively engageable to transfer torque from the motor/generator 220 and/or the engine to the transmission input member 222. A one-way clutch 262 and an engine disconnect clutch 270 are connected in parallel between the engine connection member 214 and the motor/generator 220, as in the embodiment of FIG. 1. The disconnect clutch 270 connects the motor/generator 220 to the engine connection member 214 through the damping mechanism 266 rather than directly to the engine connection member as in the embodiment of FIG. 1.

Fourth Embodiment

Figure 4:
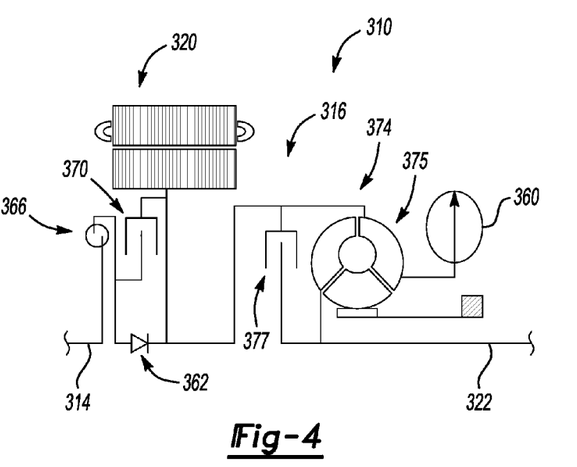
FIG. 4 is a schematic illustration of a portion of a fourth embodiment of a hybrid powertrain including a fourth embodiment of a hybrid transmission.

Referring to FIG. 4, a fourth embodiment of a hybrid powertrain 310 shows a portion of a hybrid transmission 316 with an engine connection member 314 and a transmission input member 322. An engine (not shown) is operatively connected to the engine connection member 314 and operatively connectable to a transmission gearing arrangement (not shown, but connected with the transmission input member 322), in the same fashion as with respect to the powertrain of FIG. 2. A torque transfer device 374 is a torque converter including a fluid coupling 375 and a selectively engageable torque converter lock-up clutch 377 operable in the same manner as described with respect to the like components of FIG. 2. A transmission pump 360 is driven by the motor/generator 320 through the fluid coupling 375 when the engine is not powering the transmission 316. A one-way clutch 362 and an engine disconnect clutch 370 are connected in parallel between the engine connection member 314 and the motor/generator 320, as in the embodiment of FIG. 2. The disconnect clutch 370 connects the motor/generator 320 to the engine connection member 314 through a damping mechanism 366 rather than directly to the engine connection member as in the embodiment of FIG. 2.

Fifth Embodiment

Figure 5:
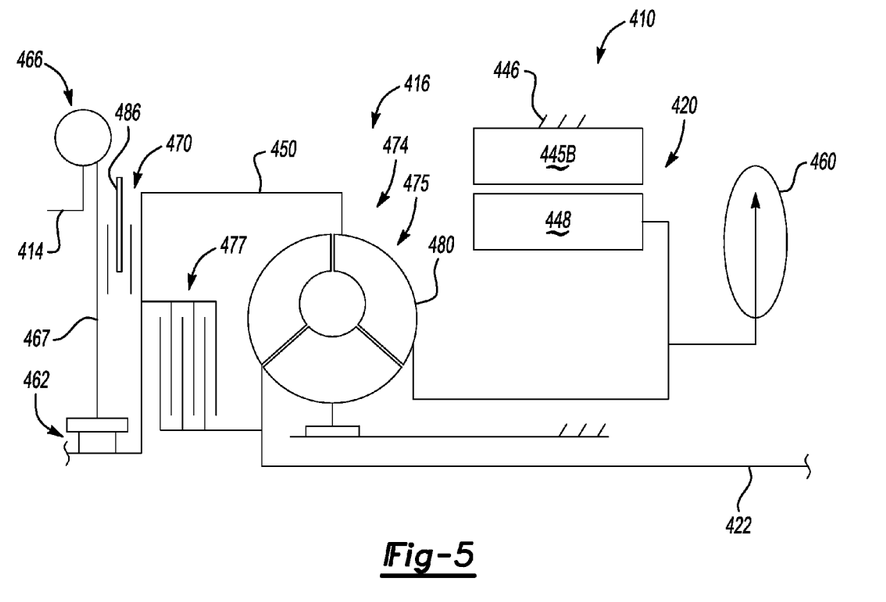
FIG. 5 is a schematic illustration of a portion of a fifth embodiment of a hybrid powertrain including a fifth embodiment of a hybrid transmission.

Referring to FIG. 5, a fifth embodiment of a hybrid powertrain 410 shows a portion of a hybrid transmission 416 with an engine connection member 414 and a transmission input member 422. An engine (not shown) is operatively connected to the engine connection member 414 and operatively connectable to a transmission gearing arrangement (not shown, but connected with the transmission input member 422), in the same fashion as with respect to the powertrain of FIG. 4. A torque transfer device 474 is a torque converter including a fluid coupling 475 and a selectively engageable torque converter lock-up clutch 477 operable in the same manner as described with respect to the like components of FIG. 4. A transmission pump 460 is driven by the motor/generator 420 when the engine is not powering the transmission 416. The motor/generator 420 includes a rotor 448 as well as a stator 445A that is grounded to a stationary member such as the transmission casing 446.

A one-way clutch 462 and an engine disconnect clutch 470 are connected in parallel between the engine connection member 414 (via the damping mechanism 466) and the motor/generator 420, as in the embodiment of FIG. 4. The disconnect clutch 470 connects the motor/generator 420 to the engine connection member 414 through a damping mechanism 466 and through the pump portion 480 of the fluid coupling 475.

As shown, the disconnect clutch 470 is a dry clutch engageable via an electromechanical actuator 486 to connect the damped side 467 of the damping mechanism 466 with the intermediate shaft 450 (and the motor/generator 420 and transmission input member 422 via the torque converter fluid coupling 475 (or via the torque converter clutch 477, if engaged)). Alternatively, the disconnect clutch 470 could be modified to make a direct connection between the motor/generator and the engine connection member 414, as in the embodiment of FIG. 2, if engine vibration isolation requirements are not as critical. Various types of commercially available dry clutches may be employed as the disconnect clutch 470, such as an electric particle clutch, an electromagnetic clutch or a motor driven worm gear. The transmission 416 has several advantages, including that torque multiplication at launch is available via the torque converter 474. Also, no auxiliary transmission oil pump is required when the engine is not rotating, as the main oil pump 460 can be driven by the motor/generator 420 independent of engine rotation.

Sixth Embodiment

Figure 6:
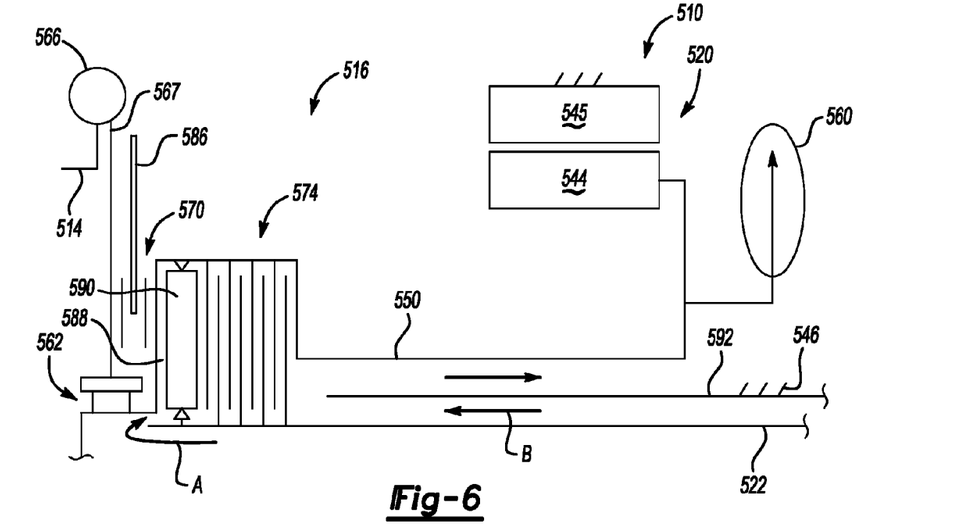
FIG. 6 is a schematic illustration of a portion of a sixth embodiment of a hybrid powertrain including a sixth embodiment of a hybrid transmission.

Referring to FIG. 6, a sixth embodiment of a hybrid powertrain 510 shows a portion of a hybrid transmission 516 with an engine connection member 514 and a transmission input member 522. An engine (not shown, but connected with the transmission input member 522) is operatively connected to the engine connection member 514 and operatively connectable to a transmission gearing arrangement (not shown), in the same fashion as with respect to the powertrain of FIG. 3. A torque transfer device 574 is a wet friction clutch selectively engageable to transfer torque from the motor/generator 520, including rotor 544 and stator 545, and from the engine connection member 514 when a dry disconnect clutch 570 is engaged or when a one-way clutch 562 is transferring torque. A transmission pump 560 is driven by the motor/generator 520 when the engine is not powering the transmission 516 and by the engine if it powers the transmission 516.

The one-way clutch 562 and the engine disconnect clutch 570 are connected in parallel between the engine connection member 514 (to which they are connected via the damping mechanism 566) and the motor/generator 520, as in the embodiment of FIG. 3. The one-way clutch 562 is operable in like manner as the one-way clutch 62 of FIG. 1 by overrunning if speed of the rotor 544 of the motor/generator 520 is faster than the speed of the engine connection member 514 and transferring torque from the engine connection member 514 to the intermediate shaft 550 if the engine connection member 514 rotates faster than the motor/generator 520.

As shown, the disconnect clutch 570 is a dry clutch engagable via an electromechanical actuator 586 to connect the damped side 567 of the damping mechanism 566 with the intermediate shaft 550. Alternatively, the disconnect clutch 570 could be modified to make a direct connection to the engine connection member 514, as in the embodiment of FIG. 2, if engine vibration isolation requirements are not as critical. Various types of commercially available dry clutches may be employed as the disconnect clutch 570, such as an electric particle clutch, an electromagnetic clutch or a motor driven worm gear. The transmission 516 has several advantages. For example, no auxiliary transmission oil pump is required when the engine is not rotating, as the main oil pump 560 can be driven by the motor/generator 520 independent of engine rotation. Transmission oil is routed through the hollow tubular input member 522 as indicated by arrow A into an apply cavity 588 to move an apply piston 590 causing the torque transfer device 574 to engage. Pressurized transmission oil is routed in an annular channel formed between the transmission input member 522 and a stationary tubular member 592 grounded to the casing and surrounding a portion of the transmission input member, as represented by arrow B, to cool the torque transfer device 574, and is returned to the transmission sump via an annular channel created between the tubular member 592 and the intermediate shaft 550. A separate water cooling system (not shown) surrounding the stator is used to cool the stator. The overall length of the transmission 516 may be reduced in comparison to a transmission utilizing a torque converter.

Seventh Embodiment

Figure 7:
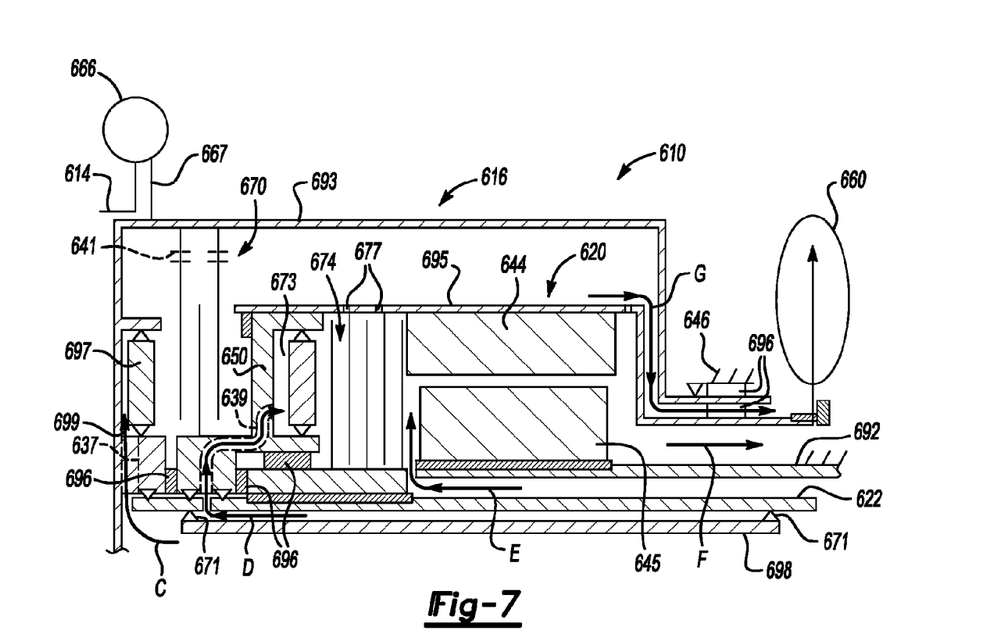
FIG. 7 is a schematic illustration of a portion of a seventh embodiment of a hybrid powertrain including a seventh embodiment of a hybrid transmission.

Referring to FIG. 7, a seventh embodiment of a hybrid powertrain 610 shows a portion of a hybrid transmission 616 between an engine connection member 614 and a transmission input member 622. An engine (not shown) is operatively connected to the engine connection member 614 and operatively connectable to a transmission gearing arrangement (not shown). In this embodiment, there is not a one-way clutch between the engine connection member and the motor/generator 620. An outer hub member, also referred to as an outer shell member 693, is rotatable with the damper side 667 of the damper 666 coaxial with the transmission input member 622. The rotor 644 of the motor/generator 620 is mounted on an inner hub member, also referred to as an inner shell member 695, that rotates with the rotor 644 coaxial with the transmission input member 622. The stator 645 is mounted to a stationary stator shaft connected with a transmission casing (not shown) radially inward of the rotor 644. A torque transfer device 674 is a wet friction clutch selectively engagable to transfer torque from the motor/generator 620 to the transmission input member 622. A wet disconnect clutch 670 is selectively engagable to transfer torque from the outer shell member 693 to the inner shell member 695, or vice versa, when engaged. The disconnect clutch 670 and the wet clutch torque transfer device 674 are connected in series. Because there is no one-way clutch, the disconnect clutch 670 remains engaged when the engine is powering the transmission 616. Bearings 696 permit relative rotation of adjacent components not clutched to one another. A transmission pump 660 is driven by the motor/generator 620 when the engine is not powering the transmission 616 and by the engine if it powers the transmission 616.

As shown, the disconnect clutch 670 is a wet clutch engagable via a piston 697 in response to pressurized transmission oil fed through the center of the transmission input member 622 inward of a tubular member 698. An additional channel 637 is provided through the outer shell member to allow oil to reach the apply cavity 699, as indicated by arrow C. The inner tubular member 698 is sealed to the transmission input member 622 with seals 671 on either end to create an oil flow channel through which pressurized oil flows to the apply chamber 673 for the wet clutch torque transfer device 674, as indicated by arrow D. Internal boring 639 is provided through the hub 650 supporting the inner shell member 695 to channel the fluid to apply chamber 673.

Pressurized fluid is also directed in the annular channel formed between the stationary tubular member 692 and the transmission input member 622 as indicated by arrow E, to then flow radially outward toward rotor 644 and back toward the low pressure sump area as indicated by arrow F. The inner shell member 695 is perforated as indicated by perforations 677, only some of which are numbered. This allows the cooling oil flow to flow outward to the cavity between the inner shell member 695 and the outer shell member 693. Additional cooling oil flows to this cavity from the apply cavity 699 of the disconnect clutch 670 via one or more orifices 641 through the plates of the disconnect clutch 670. When there is a relative rotational speed between the inner and outer shell members 695, 693, fluid in this cavity will be at a higher pressure level than the sump fluid, and thus will flow back to the sump through an oil escape route between the shell members 693, 695 and past the bearing 696 to the sump, as indicated by arrow G. As with the other embodiments, no auxiliary transmission oil pump is required, as the main oil pump 660 can be driven by the motor/generator 620 independent of engine rotation. Additionally, the motor/generator 620 is packaged within the transmission casing 646 (only partially shown) so that transmission oil can be used to cool the stator 645, avoiding the need for a water cooling system. The overall length of the transmission 616 may be reduced in comparison to a transmission utilizing a torque converter.

Eighth Embodiment

Figure 8:
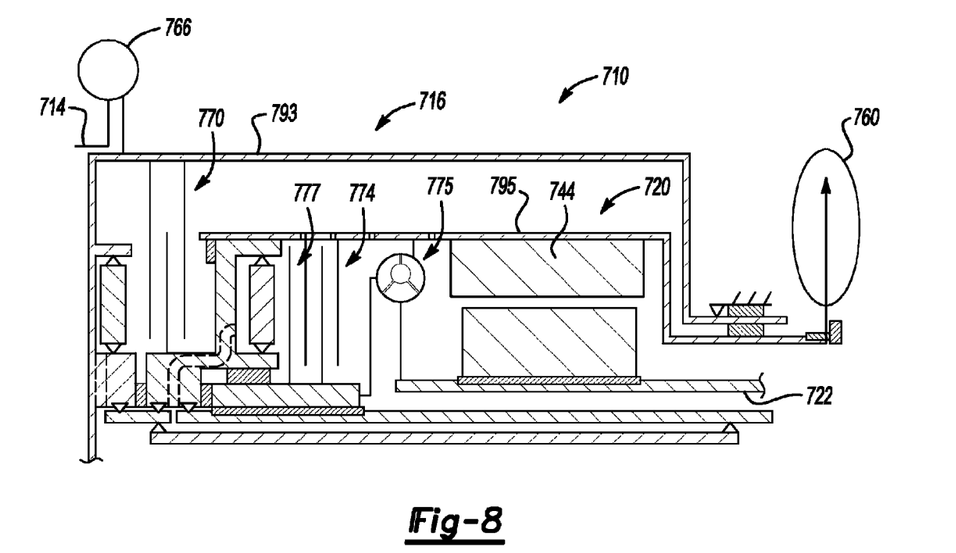
FIG. 8 is a schematic illustration of a portion of an eighth embodiment of a hybrid powertrain including an eighth embodiment of a hybrid transmission.

FIG. 8 shows a portion of a hybrid powertrain 710 including a portion of a hybrid transmission 716 (transmission gearing arrangement and output member not shown). The powertrain 710 and transmission 716 are identical to the powertrain 610 and transmission 616 of FIG. 7 except that the torque transfer device for transferring torque from the motor/generator 720 to the transmission input member 722 is a torque converter 774 with a fluid coupling 775 and wet torque converter clutch 777 with apply piston, in lieu of the wet clutch torque transfer device 674. The inner shell member 795 is rotatable with the rotor 744 which also drives the main transmission pump 760 when the engine connected with the outer shell member 793 through damping mechanism 766 and engine connection member 714 is not powered. Wet disconnect clutch 770 can be engaged to transfer torque from the rotor 744 and inner shell member 795 to the outer shell member 793, and thereby to engine connection member 714 to start the engine connected thereto while the motor/generator 720 also provides torque to the transmission input member 722 through the torque converter 774 to launch the vehicle from a stop. Because there is no one-way clutch operatively connected between the engine and the transmission input member, the disconnect clutch 770 remains engaged when the engine is powering the transmission 716. The pressurized fluid routing for clutch engagement and cooling is the same as described with respect to the transmission 616.

Ninth Embodiment

Figure 9:
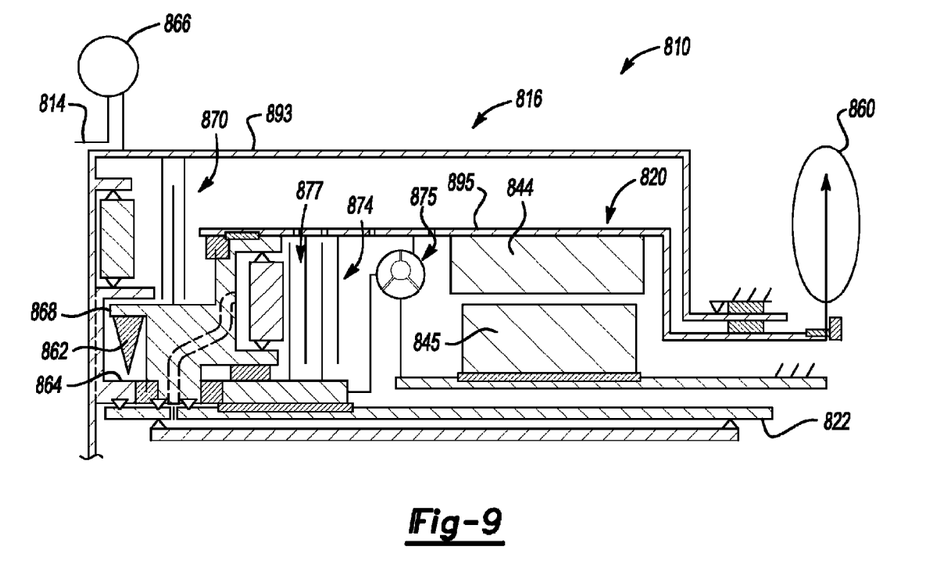
FIG. 9 is a schematic illustration of a portion of a ninth embodiment of a hybrid powertrain including a ninth embodiment of a hybrid transmission.

FIG. 9 shows a portion of a hybrid powertrain 810 including a portion of a hybrid transmission 816 (transmission gearing arrangement and output member not shown). The powertrain 810 and transmission 816 are identical to the powertrain 710 and transmission 716 of FIG. 8 except that a one-way clutch 862 is included to transfer torque from the outer shell member 893 to the inner shell member 895 when the engine connected to engine connection member 814 is rotating faster than the rotor 844 of motor/generator 820. Under such circumstances, the outer shell member 893, including a hub portion thereof serving as a first rotatable element 864 of the one-way clutch 862 locks with hub portion 868 of the inner shell member 895, serving as a second rotatable element of the one-way clutch 862, to transfer torque through the one-way clutch. The one-way clutch overruns when the rotor 844 provides torque such that the inner shell member 895 rotates faster than the outer shell member 893, such as when the engine is not started and the motor/generator 820 powers the transmission 816 from a stop through the fluid coupling 875 of the torque converter 874. The main transmission pump 860 is driven by the motor/generator 820 during this period. The disconnect clutch 870 may be engaged to transfer torque from the inner shell member 895 to the outer shell member 893 to start the engine, such as when the charge of the battery connected with the stator 845 runs low. After the engine reaches a speed greater than that of the rotor 844, the one-way clutch 862 will carry torque provided by the engine through the engine connection member 814 and damping mechanism 866 to the outer shell member 893 and through the one-way clutch 862 to the inner shell member 895, through the torque converter 874 (either through the fluid coupling 875 or through the torque converter lock-up clutch 877 which may be engaged to by-pass the fluid coupling 875 to transfer torque while minimizing spin losses) to the transmission input member 822, allowing the disconnect clutch 870 to be disengaged. During this period, the pump 860 will be driven through the one-way clutch 862 via the inner shell member 895 to which the pump 860 is mounted. Accordingly, the disconnect clutch 870 can be smaller in size than the disconnect clutch 770 of FIG. 8, as the one-way clutch 862 carries engine torque when the engine powers the transmission 816. The pressurized fluid routing for clutch engagement and cooling is the same as described with respect to the transmission 616.

Tenth Embodiment

Figure 10:
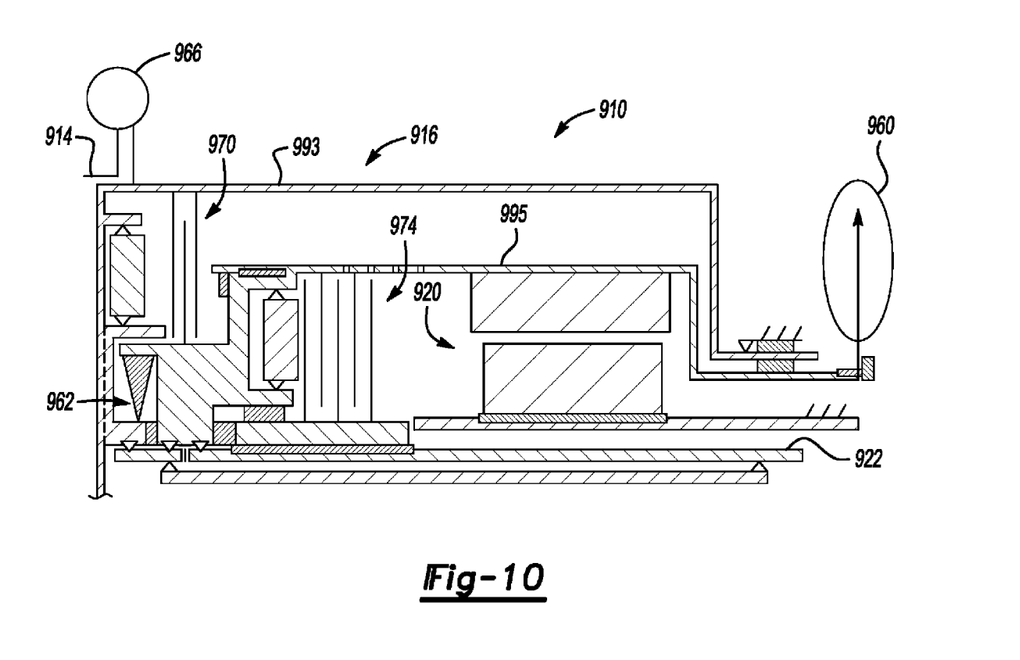
FIG. 10 is a schematic illustration of a portion of a tenth embodiment of a hybrid powertrain including a tenth embodiment of a hybrid transmission.

FIG. 10 shows a portion of a hybrid powertrain 910 including a portion of a hybrid transmission 916 (transmission gearing arrangement and output member not shown). The powertrain 910 and transmission 916 are identical to the powertrain 810 and transmission 816 of FIG. 9, except that a wet clutch torque transfer device 974 is used (in lieu of the torque converter 874 with fluid coupling 875 and torque converter clutch 877) to transfer torque from the inner shell member 995 to the transmission input member 922. An engine connection member 914 connected with an engine (not shown) and to an outer shell member 993 through a damping mechanism 966, a disconnect clutch 970, a one-way clutch 962, a motor/generator 920 and a main transmission pump 960 are arranged and operable as described with respect to the like components of FIG. 9.

While the best modes for carrying out the invention have been described in detail, those familiar with the art to which this invention relates will recognize various alternative designs and embodiments for practicing the invention within the scope of the appended claims.

The invention claimed is:

1. A hybrid transmission for use with an engine, comprising:
    an engine connection member configured for connection with the engine;
    an electric motor;
    a transmission gearing arrangement;
    a transmission input member connected with the transmission gearing arrangement;
    a torque transfer device controllable to transfer torque from the motor to the transmission input member upstream in power flow from the mechanical transmission gearing arrangement;
    a disconnect clutch selectively engagable to operatively connect the engine connection member with the motor to permit the motor to start the engine;
    a one-way clutch having a first rotatable element continuously connected for rotation with the engine connection member and a second rotatable element continuously connected for rotation with the motor at a common speed and configured to overrun when the second rotatable element rotates faster than the first rotatable element; and
    wherein the disconnect clutch is arranged in parallel with the one-way clutch; the one-way clutch thereby carrying torque when the engine powers the transmission and overrunning when the motor powers the transmission.

2. The hybrid transmission of claim 1, wherein the torque transfer device is a fluid coupling.

3. The hybrid transmission of claim 1, wherein the torque transfer device is a clutch directly connecting the motor with the transmission input member; and wherein the hybrid transmission does not include a fluid coupling.

4. The hybrid transmission of claim 3, wherein the torque transfer device is a wet clutch.

5. The hybrid transmission of claim 1, wherein the disconnect clutch is a dry, electro-mechanically actuated clutch.

6. The hybrid transmission of claim 1, wherein the disconnect clutch is a wet clutch selectively engagable via pressurized transmission fluid.

7. The hybrid transmission of claim 6, wherein the input member is hollow; and further comprising:
    a tubular member coaxial with and inside of the transmission input member and sealed therewith to define therewith a channel for transporting pressurized transmission fluid to the torque transfer device.

8. The hybrid transmission of claim 1, further comprising:
    inner and outer hub members coaxial with the input member; wherein the motor includes a rotor and a stator; wherein the rotor is concentric with and surrounds the stator and is supported for rotation on the inner hub member; wherein the engine is operatively connected with the outer hub member; and wherein selective engagement of the disconnect clutch connects the inner and outer hub members.

9. The hybrid transmission of claim 8, wherein the inner hub member is perforated to permit transmission oil flow past the motor and torque transfer device for cooling and lubrication thereof.

10. The hybrid transmission of claim 1, further comprising:
    a damping mechanism connecting the engine with the torque transfer device.

11. The hybrid transmission of claim 10, wherein the disconnect clutch connects the motor to the damping mechanism, thereby operatively connecting the motor to the engine connection member.

12. The hybrid transmission of claim 10, wherein the disconnect clutch connects the motor for common rotation with the engine connection member and bypasses the damping mechanism.

13. The hybrid transmission of claim 1, wherein the motor is controllable to operate as a generator.

14. The hybrid transmission of claim 1, further comprising:
a transmission pump continuously operatively connected with the motor and driven by the motor.

15. The hybrid transmission of claim 1, wherein the transmission is characterized by an absence of any additional motor operatively connected with the mechanical transmission gearing arrangement.

16. The hybrid transmission of claim 1, wherein the motor is not operatively connected for torque transfer to the transmission gearing arrangement other than by the torque transfer device.

17. A hybrid transmission for use with an engine, comprising:
an engine connection member configured for connection with the engine;
an electric motor;
a mechanical transmission gearing arrangement;
a transmission input member;
a fluid coupling operable to transfer torque from the motor to the transmission input member upstream in power flow from the transmission gearing arrangement;
a disconnect clutch selectively engagable to operatively connect the engine connection member with the motor to permit the motor to start the engine;
a one-way clutch having a first rotatable element continuously connected for rotation with the engine connection member and a second rotatable element continuously connected for rotation with the motor and configured to overrun when the second rotatable element rotates faster than the first rotatable element;
wherein the disconnect clutch is arranged in parallel with the one-way clutch; the one-way clutch thereby carrying torque when the engine powers the transmission and overrunning when the motor powers the transmission;
a damping mechanism connecting the engine with the fluid coupling; and
a transmission pump continuously operatively connected with the fluid coupling and driven by the motor.

18. A method of starting an engine connected with a hybrid transmission comprising:
providing stored electrical power from a battery connected with a motor to the motor to run a transmission pump connected with the motor to thereby pressurize fluid;
engaging selected ratio clutches connected with a transmission gearing arrangement using the pressurized fluid;
powering the transmission through a torque transfer device via the motor;
monitoring a charge level of the battery;
engaging a disconnect clutch between the motor and the engine when the monitored battery charge level falls to a predetermined level, thereby starting the engine; wherein the engine transfers torque through a one-way clutch arranged in parallel with the disconnect clutch and through the torque transfer device to the transmission gearing arrangement when engine speed is at least at motor speed; wherein the one-way clutch overruns when the motor speed is greater than engine speed; and
disengaging the disconnect clutch when the engine transfers torque through the one-way clutch.

* * * * *